May 19, 1936. H. L. HARRISON 2,041,337
MACHINE FOR TREATING PIPE AND PIPE LINES
Filed June 9, 1930   12 Sheets-Sheet 3

May 19, 1936. H. L. HARRISON 2,041,337
MACHINE FOR TREATING PIPE AND PIPE LINES
Filed June 9, 1930 12 Sheets-Sheet 5

May 19, 1936.  H. L. HARRISON  2,041,337
MACHINE FOR TREATING PIPE AND PIPE LINES
Filed June 9, 1930    12 Sheets-Sheet 11

Inventor:
Horace L. Harrison
By A. Miller Belfield
Atty.

Patented May 19, 1936

2,041,337

UNITED STATES PATENT OFFICE 2,041,337

MACHINE FOR TREATING PIPE AND PIPE LINES

Horace L. Harrison, New York, N. Y.

Application June 9, 1930, Serial No. 460,080

17 Claims. (Cl. 242—11)

The present invention relates in general to a machine for cleaning, coating and/or wrapping pipe or pipe lines.

One of the objects of my invention is to provide a machine of this character that may straddle the trench in which a pipe line is or is to be laid, propelling itself and being automatically steered along the trench.

Another object is to provide improved feeding mechanism for feeding the pipe line through the machine in a positive and efficient manner.

Another object is to provide improved feeding mechanism which will accommodate itself automatically to irregularities in the pipe line and the couplings between the various sections of pipe constituting such line.

There are other objects of my invention which together with the foregoing will be described in detail in the specification which is to follow, taken in conjunction with the accompanying drawings forming a part thereof.

In practicing my invention I provide a supporting structure mounted upon wheels specially spread apart to straddle a trench, propelled ordinarily by an internal combustion engine driving the wheels through suitable gearing. I also provide steering mechanism for causing the machine ordinarily to follow the line of the trench as it is propelled. Mechanism is mounted on the structure for feeding a pipe through it which is treated with a sealing or insulating compound and wrapped by wrapping mechanism mounted on the structure. The sealing compound is carried in suitable receptacles.

Generally in the operation of my improved machine it is placed straddle of a trench, the pipe is then fed into the machine and the machine is started forward This operation cleans and treats the pipe as well as wraps it, the machine following the trench.

Referring now to the drawings—

Fig. 13 is a similar view of the same illustrating the treating tanks on either side of the wrapping mechanism, partly in section;

Reference character 1 designates generally a supporting structure of suitable size constructed from metal structural shapes or other suitable framing mounted upon four wheels 2. The rear wheels 2 are mounted upon shafts 3 carried in suitable bearings 4 in the structural frame 1. The front wheels are mounted upon suitable shafts 5 rotating in bearings in the brackets 6 which are rotatably secured to brackets 7 by bearings 8. Rods 9 are secured to the brackets 6 by king bolts 10.

The king bolts 10 also serve to support guarding brackets 11. A tie-rod 12 suitably connects the two brackets 11. The ends of the rods 9 are spread apart by a spacing member 12 which also carries guiding members 13 spaced apart a sufficient distance to bear against the sides of the trench 14, or may be arranged to surround and follow the pipe line with similar stationary members secured to frame and bearing against the trench. This mechanism serves to turn the front wheels of the machine so that it will follow the path of the trench 14. A boiler, heater or other receptacle 15 of general cylindrical shape is suitably mounted to the structural frame 1 by brackets 16 supporting bearings 17 carrying shafts 18 secured to the boiler 15. The shafts 18 are secured to the boiler at a point above the center, so that the tank will be maintained in a vertical plane at all times irrespective of the variations in the ground of the trench. The boiler 15 is also provided with four shafts 19, two on each side of the boiler, and on a line with the shafts 18 so that the boiler may be bodily lifted from the bearings 17. By fixing wheels to the axles or shafts 19 the boiler may be suitably pulled to any desired point.

Figure 8:
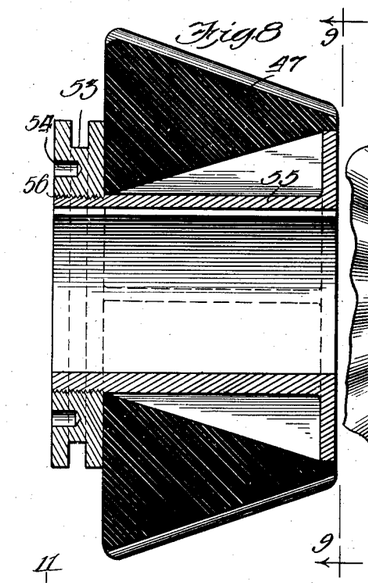
Fig. 8 is a sectional elevation of one of the feeding rollers.
Figure 9:
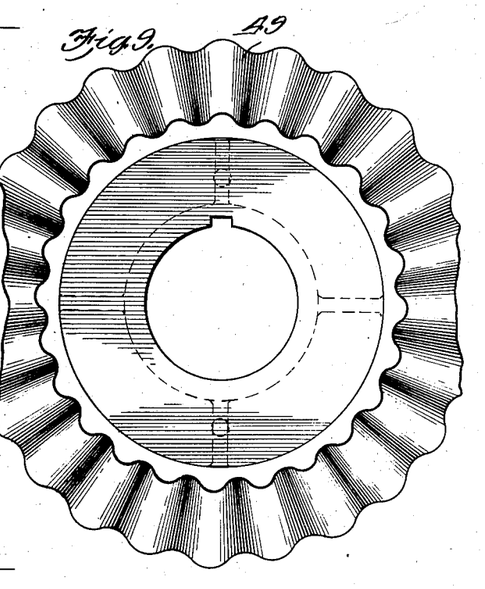
Fig. 9 is an end elevation of the same taken along the line 9—9 of Fig. 8 looking in the direction of the arrows.

For propelling purposes the structural frame 1 is provided with an internal combustion engine 22 of any desired size, a clutch controlled by a pedal 23 and transmission mechanism 24 having any suitable number of steps, and a reverse gear controlled from a gearshift lever 25. The driver's seat 20 may be suitably secured to the housing of the bearing 17 by bolts 21 or at any other point of vantage to operator. The driveshaft from the transmission is provided with a sprocket meshing with the chain 26 which drives the sprocket 27 affixed to a shaft 28 carried in bearings 29 in the structural frame. The shaft 28 is provided with a worm which meshes with the wormwheel 30 mounted upon a shaft 31 carried in bearings 32 in the structural frame and having a spur gear 33 mounted at one end thereof and meshes with a spur gear 34 suitably affixed to a shaft 35 rotatably held by bearings 36 in the structural frame 1. The outer end of the shaft 35 is provided with a sprocket 37 which carries a chain 38 meshing with a sprocket 39 mounted on a shaft 40 rotatably carried in bearings in the frame 1. The shaft 40 is provided with a spur gear 41 meshing with a spur gear 42 mounted upon a shaft 43. The spur gear 34 meshes with a spur gear 44 mounted upon a shaft 45 rotating in bearings 46 in the structural frame 1. The shafts 40 and 43 are each provided with split rollers 47 and 48, respectively, having a generally concave corrugated surface 49, see Fig. 9. The corrugated rollers 47 and 48 may be constructed of rubber or other suitable material to provide a tough and wear-resisting surface for frictionally engaging the pipe. A pair of compression springs 50 and 51 are mounted on either side of the split roller 47 and are seated at their outside ends on members of the structural frame 1. The other ends of the springs 50 and 51 compress against washers 52 which hold a pair of angularly shaped brackets 53 in position. The brackets 53 are prevented from turning by dowel pins 54 mounted in the washers 52, see Fig. 8. The split rollers 47 may be held in place by having a conically shaped central opening fastened on a sleeve 55 which carries the washers 54 threaded on its outer end at 56. The whole assembly of one of the split rolls 47 is thus movable on the shaft 40 carrying with it the bracket 53.

Figure 10:
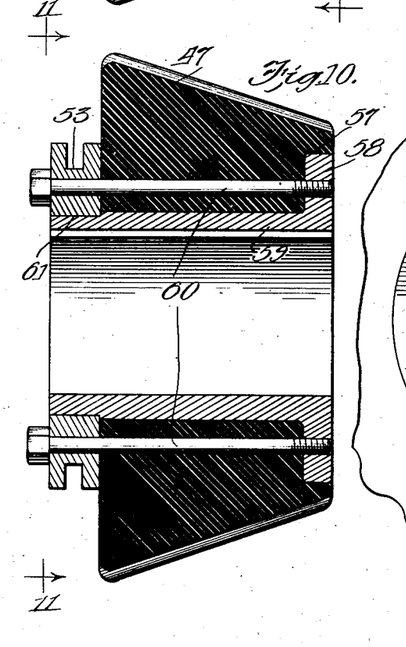
Fig. 10 is a view of a modified form of one of the feeding rollers similar to Fig. 8.
Figure 11:
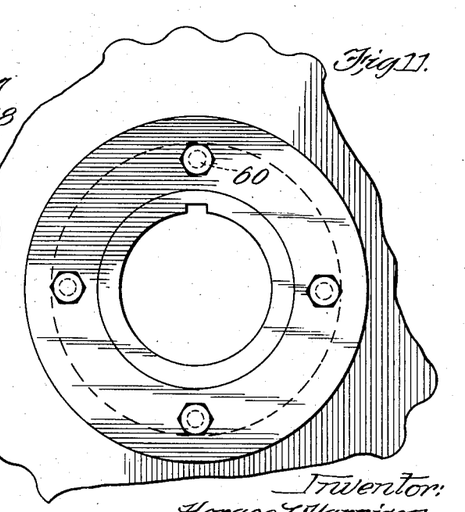
Fig. 11 is an end elevation of the same.
Figure 12:
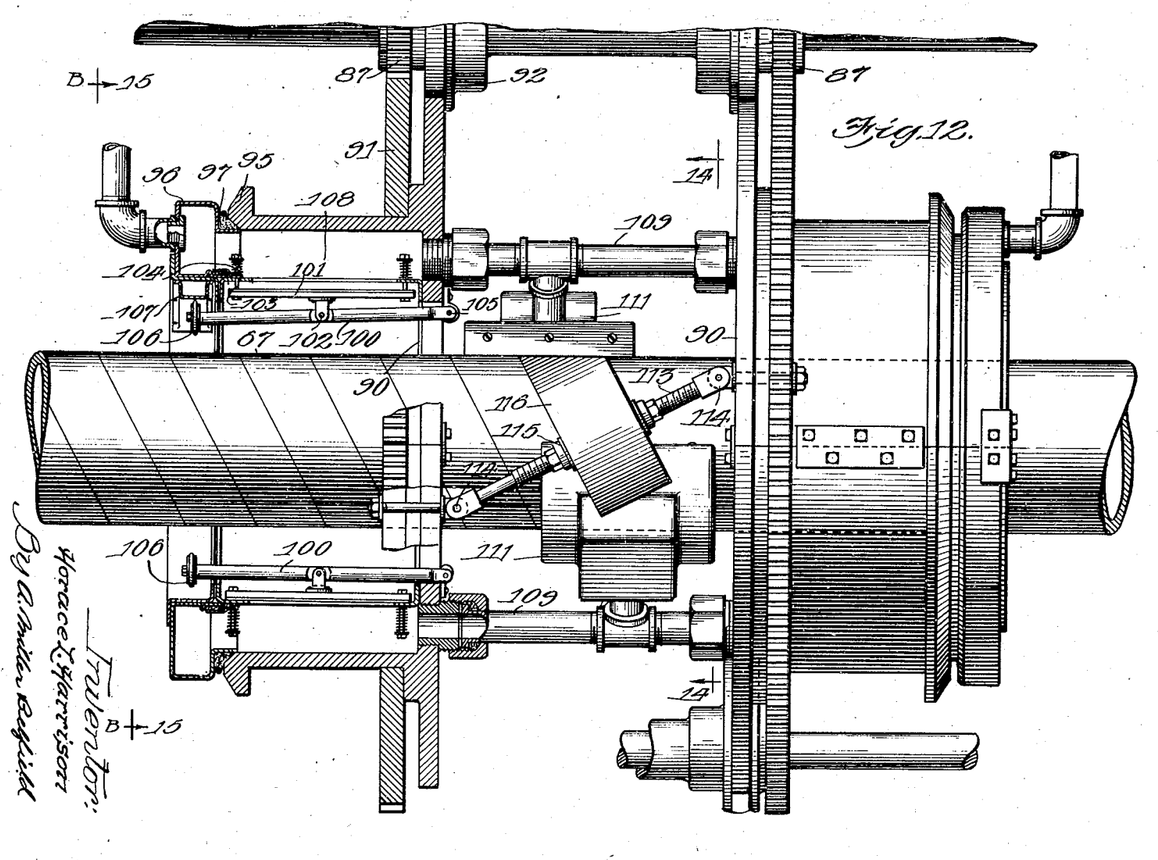
Fig. 12 is a detail of the wrapping mechanism with certain of the parts broken away for clearness.
Figure 14:
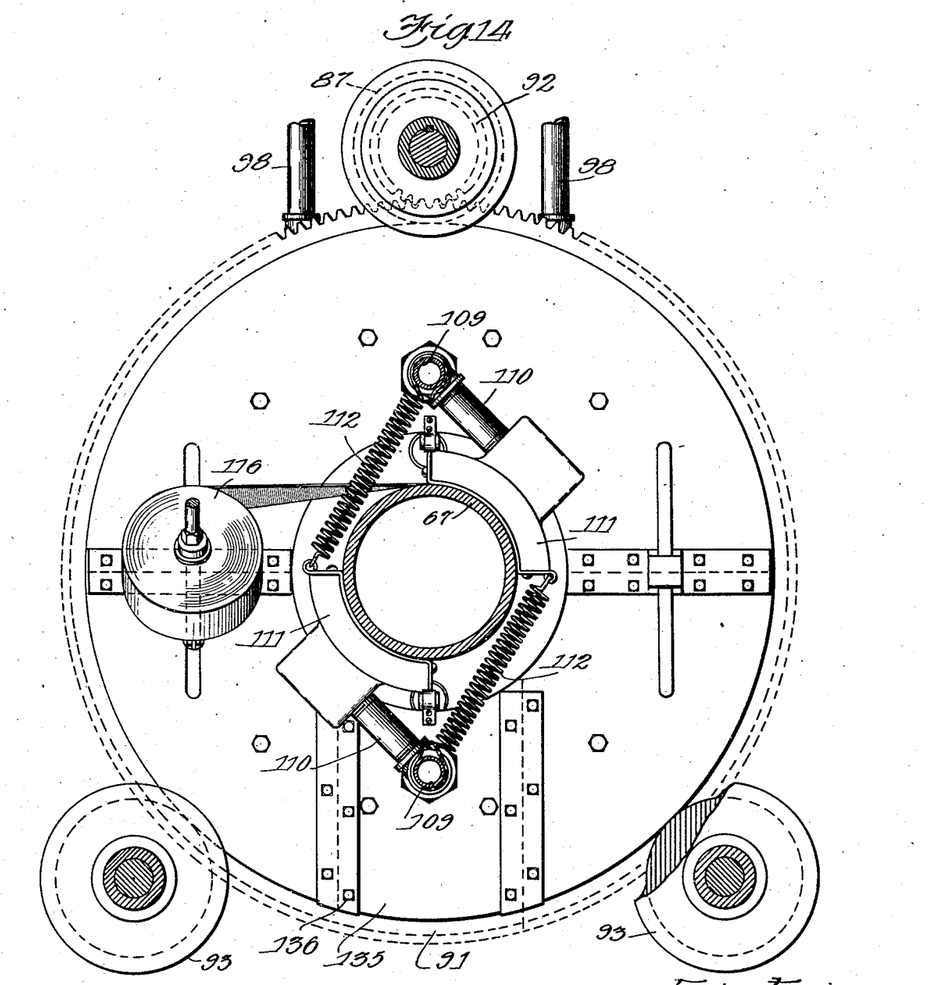
Fig. 14 is a sectional elevation taken along the line 14—14 of Fig. 12 of another detail of the wrapping mechanism.
Figure 15:
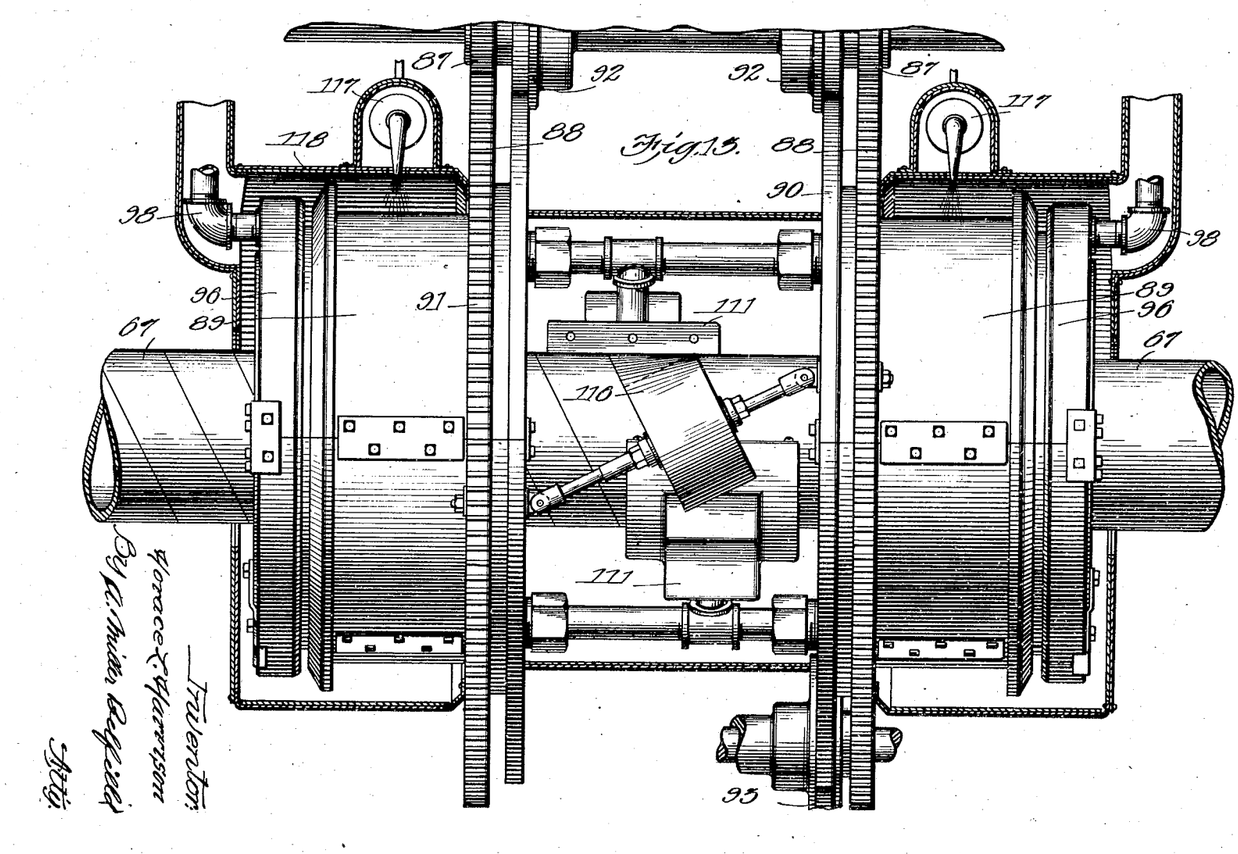
Fig. 15 is a sectional elevation of the wrapping mechanism of Fig. 12 taken along the line 15—15 of that figure looking in the direction of the arrows.
Figure 16:
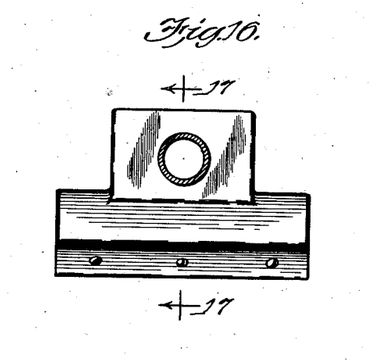
Fig. 16 is a detail of one of the wrapping units in elevation.
Figure 17:
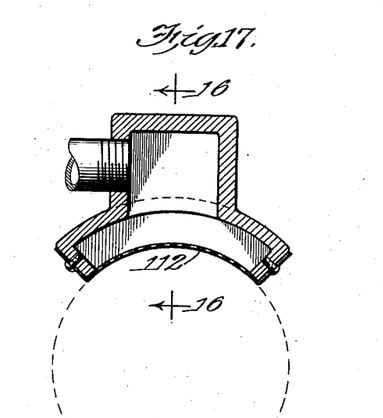
Fig. 17 is a cross section of the same taken along the line 17—17 of Fig. 16 looking in the direction of the arrows.
Figure 18:
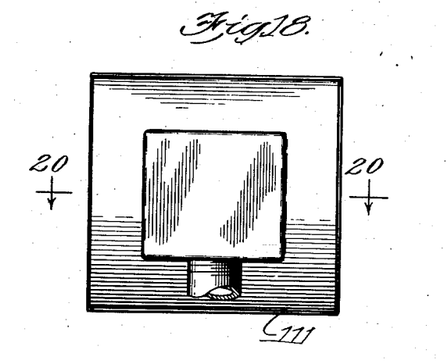
Fig. 18 is a top plan of the unit of Fig. 16.
Figure 19:
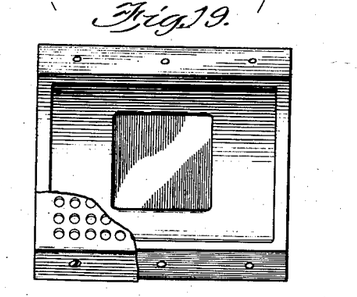
Fig. 19 is a similar view with a portion broken away to illustrate the perforations for feeding compound in the lower surface.
Figure 20:
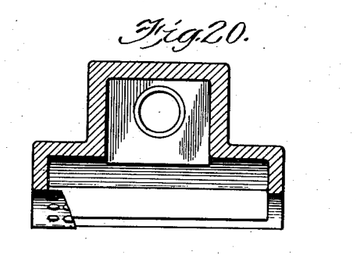
Fig. 20 is a medial cross section of Fig. 18 along the line 20—20.
Figure 21:
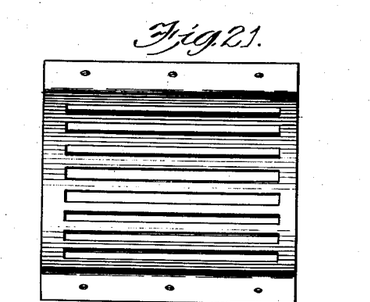
Fig. 21 is a bottom plan of a slightly modified wrapping element showing a slotted arrangement for feeding the sealing compound.

An alternative construction of the mounting for one of the split rolls 47 is illustrated in Fig. 10 where the roll is provided with a recess 57 in which an enlarged portion 58 of the sleeve 59 is adapted to fit the bracket 53 being held in place by long bolts 60 threaded into the enlarged flange portion 58 of the sleeve 59, the bracket 53 being fitted on a reduced portion 61 of the sleeve 59. The lower shaft 43 also carries the split rollers 48 which are similarly mounted upon sleeves which carry brackets 61, the whole assembly being held in place by the compression springs 62 and 63. The brackets 53 and 62 on one side are connected on each side by bolts 64 passing through openings in the brackets 53 and 62. A pair of cam members 65 suitably united and spaced apart by bolts 66 are rotatable about each bolt 64. The cam members 65 are somewhat semi-circular in shape and are eccentrically mounted on the bolts 64. The pipe line 67 is fed between the split rolls 47 and 48 and bears against the cams 65 on either side, which are held in firm contact with the pipe 67 by the compression springs.

Similarly constructed rolls are mounted on the shafts 35 and 45 and also perform the function of feeding the pipe through the machine.

Intermediate of the shaft 28 is a dog clutch 69 which serves to drive the tubular shaft 68 which is mounted in bearings in the structural frame 1 through an ordinary dog clutch 69. The shaft 70 is a continuation of the main shaft 28 and carries a dog clutch 71. The clutches 69 and 71 are adapted to be operated by the member 72 which may be operated by a screw 73. A connecting link 74 connects the operating member 72 to a member 75 which supports a link 76 which is connected to a member 77 pivoted on the structural frame at 78 and connected to the dog clutch 71 at its other end. In this manner the members 72 and 77 can be operated simultaneously to throw the clutches 69 and 71, respectively. The shaft 70 drives a worm which engages the worm wheel mounted on a shaft 79 rotating in bearings in the structural frame 1. One end of this shaft is provided with a spur gear 80 meshing with a spur gear 81 suitably fixed to a shaft 82 rotating in bearings in the structural frame 1. One end of the shaft 82 is provided with a sprocket 83 carrying a chain 84. The spur gear 81 meshes with a spur gear 85 mounted upon a shaft 86 rotating in bearings in the structural frame 1 in a manner similar to the driving mechanism on the front end.

The shaft 79 carries at its other end a driving sprocket 128 which carries a chain 129 driving the sprocket 130 affixed to the rear axle 3, which brings about the rotation of the rear wheels 2 to drive the machine.

The shafts 82 and 86 carry friction rolls similar to the rolls 47 and 48 already described, in addition to the cam construction described in connection with rolls 47 and 48. The chain 84 drives a similarly mounted pair of rolls at the other end of the machine that have been broken away. The rolls at the rear of the machine are identical and are mounted in a manner similar to the rolls 47 and 48, already described. These rolls are carried on an extension on the structural frame 1.

The shaft 68 is provided with a pair of spur gears 87 which mesh with large annular gears 88 about the periphery of the cylindrically shaped tanks 89. The inner ends of these tanks are closed by end walls 90. The tanks are supported in position about their periphery by flanged members 91 bearing in pulleys 92 suitably affixed to shaft 68. The bottoms of the tanks 89 are similarly supported by the flanges 91 bearing in the pulleys 93 and mounted upon a shaft 94 rotatably held in bearings in the structural frame 1. The open ends of the tanks 89 are provided with a flanged surface 95 which forms a bearing with a stationary tank portion 96 at 97. This bearing surface may be made tight by suitable packing. A pipe 98 leads upward from each of the stationary tanks 96 to the main tank 15, each pipe being provided with a suitable valve 99. In order that the main tank 15 may be at all times vertically suspended regardless of the variation of the ground, it is desirable to provide a swivel connection in pipe 98 or a flexible hose connection may be substituted in place of pipe 98. A valve operating mechanism 100 is pivotally mounted to a member 101 on the interior of each tank 89 at 102. The member 101 is resiliently supported on bolts 103 around which helical compression springs are encircled. One end of the operating member is pivoted at 105 and the other end carries a roller 106 that is adapted to engage a stationary cam 107 at intervals during the rotation of the tank 89, thereby forcing the valve member 101 downwardly and permitting any fluid in the container portion 108 to flow through slots or openings therein on to the pipe 67. There are a pair of valves 101 associated with each of the tanks 89. Each tank 89 is joined by two pipes 109 which serve as mountings for the pipes 110 rotatably affixed thereto. Each pipe 110 carries an ironing member 111 which has a concave inner surface 112 and is provided with openings in that surface. These openings may either be circular or slots, see Figs. 16 to 21, inclusive. Each ironing member 111 is held in place by helical springs 112 connected on one end to an eye in each ironing member and on the other end to the pipes 109. These ironing members serve to press against the pipe and assist in its wrapping. A supporting bracket 113, which is split in the center, is pivotally mounted to the end walls 90 of each tank 89 at the points 114. This bracket is provided with a spool 115 which carries a roll of insulating or wrapping material 116 thereon. The angle at which the bracket 113 is mounted determines the closeness or lap of the wrapping of the insulating material about the pipe 67 at a given speed of travel which, of course, will always be constant.

If it is desired to maintain the fluid in the chambers 108 at any desired temperature than as supplied from the main boiler 15, torches 117 may be mounted adjacent thereto to heat the walls of the rotatable cylinders 89. An insulated supporting surface 118 may be employed to form a chamber about the cylinders 89.

Figure 22:
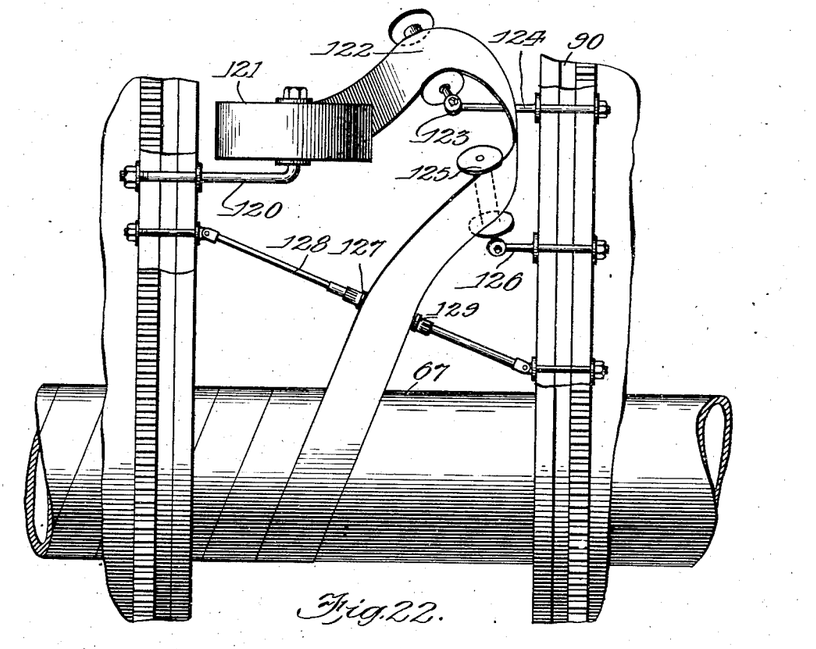
Fig. 22 is a detail of a modified form of wrapping mechanism in elevation.
Figure 23:
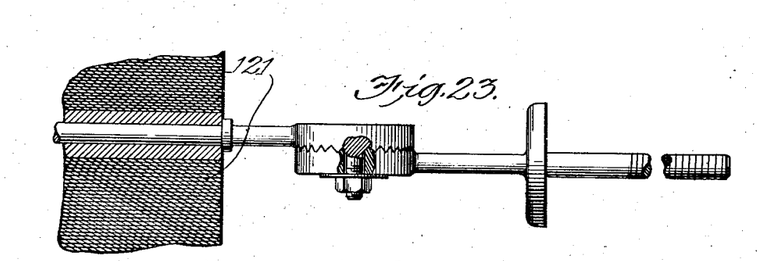
Fig. 23 is a view of the mounting bracket in elevation of one of the guiding spools of Fig. 22.
Figure 24:
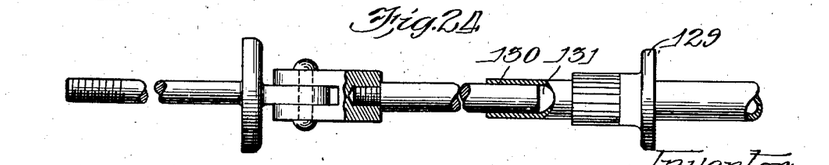
Fig. 24 is another detail of one of the mounting brackets for another guiding spool shown in Fig. 22.

Figs. 22 to 24 illustrate a somewhat different method of mounting the wrapping mechanism. This consists in providing an L-shaped bracket 120, which is affixed to one of the end walls 90 of one of the tanks 89 and carries a spool of insulating material 121 rotatably affixed thereto. The insulating or wrapping material is threaded over a spool or idler pulley 122 angularly held by a jaw-tooth bracket 123 mounted upon the member 124 affixed to the other end wall 90 of the other tank 89. The insulating material is then threaded over another angularly positioned spool 125 which is also mounted on a bracket 126. Lastly the insulating material is threaded over a pulley 127 carried on a bracket 128 which is provided with two flanged sleeves 129 which may press against the insulating material by threading the surface 130 and suitably adjusting it or providing a helical compression spring in the telescoping portion 131. This construction of winding mechanism permits the thickness or lap of winding on the pipe 67 to be varied by altering the angular positions of the spools 122 and 125 as well as the spool 127.

Each of the cylinders 89 is provided with a cut-away portion 135 through which the pipe 67 may be passed into the machine. Portions 135 are suitably bolted to the cylinders 89 by bolts 137. In addition to the recess for admitting the pipe the cylinders 89 and 96 may also be split in two by loosening the connecting members 136 by means of the bolts 137, as well as the connecting members 138 through the bolts 139.

Having described in detail the general mechanical construction of my invention, I shall now explain its operation.

It will be assumed that the machine is moved over a trench containing a pipe line; the tank 15 is filled with a suitable insulating and sealing compound, such as bitumen, tar, etc., and heated in any desired manner to give it the proper degree of fluidity, the pipe is raised in position by a hoisting, or other mechanism, which may be attached to the front end of the machine, and is then threaded through the front rollers 47 and 48, the rollers mounted on the shafts 35 and 45, thence through the openng in the first cylinders 89 and 96, through the wrapping mechanism, the ironing members 11 being separated a sufficient distance to permit such threading, thence through the other cylinders 96 and 98 to the rollers mounted on the shafts 82 and 86, and thence to the last pair of rollers. In this operation it has been assumed that it is desired to use the machine from one end of the pipe line. However, if the pipe line is picked up in the middle, the bottom rollers on the shafts 86, 45 and 43 may be removed and the sections in the cylinders 89 and 96 dropped to permit the pipe to come into place after which the rollers and the cylinder portions may be replaced in an obvious manner. The wrapping mechanism may also be dismantled and assembled about the pipe. Thus it will also be seen that the machine may be held stationary removing the wheels and separate or joined lengths of pipe may be passed through it and treated, coated, cleaned and/or wrapped.

In order to start the machine into operation, the motor 22 is started and the gearshift lever 25 is operated through its various stages to drive the main shaft 28 at its proper speed. This brings about the movement of the vehicle forward, power being transmitted by the sprocket 128 to the shaft 86 by the chain 129. In this manner the machine is caused to move forward, the rollers on the shafts 39, 43, 35 and 45, as well as 82 and 86, causing the feeding of the pipe through the machine at the same rate that the machine progresses forwardly. There is no operation of the wrapping and insulating mechanism unless the clutch member 73 is operated, the pipe merely continuing to be moved through the machine as it progresses forwardly. The steering members 13 press against each side of the trench and/or made to follow pipe line and serve to steer the front wheels 2 so that the machine will follow the contour of the trench.

In order to bring about the operation of the wrapping and insulating mechanism the operator will move the clutch member 73, which causes the clutches 69 and 71 to be thrown into engagement with the clutch members on the tubular shaft 68. Movement of the shaft 68 immediately brings about the rotation of the rotatable cylindrical tanks 89 on either side by the engagement of the gear 87 with the rim gear 88. The rotation of the tanks 89 brings about the intermittent operation of the valve members 100 through the cams 107 whereby the sealing and insulating compound is applied to the pipe through openings in the elements of the chamber 108 before the pipe reaches the wrapping mechanism. As the cylinders 89 rotate the wrapping mechanism is revolved about the pipe and brings about the application of the insulating material thereto in layers, depending upon the angle at which the wrapping mechanism is set. As the wrapping is applied to the pipe the insulating and sealing compound is applied to each layer of the material through the openings in the ironer members 111 and these members, by reason of the springs 112, serve to force the wrapping into close contact with the pipe as it passes through. The wrapped pipe after passing through the wrapping mechanism is again coated with the sealing and insulating compound by means of the valve members 100. The pipe is then fed through the two remaining sets of rolls and deposited in the trench to the rear of the machine.

It will be obvious that instead of employing one type of compound from the main tank 19 that this tank may be divided into two compartments and apply different kinds of compound to the pipe before and after wrapping.

Figure 1:
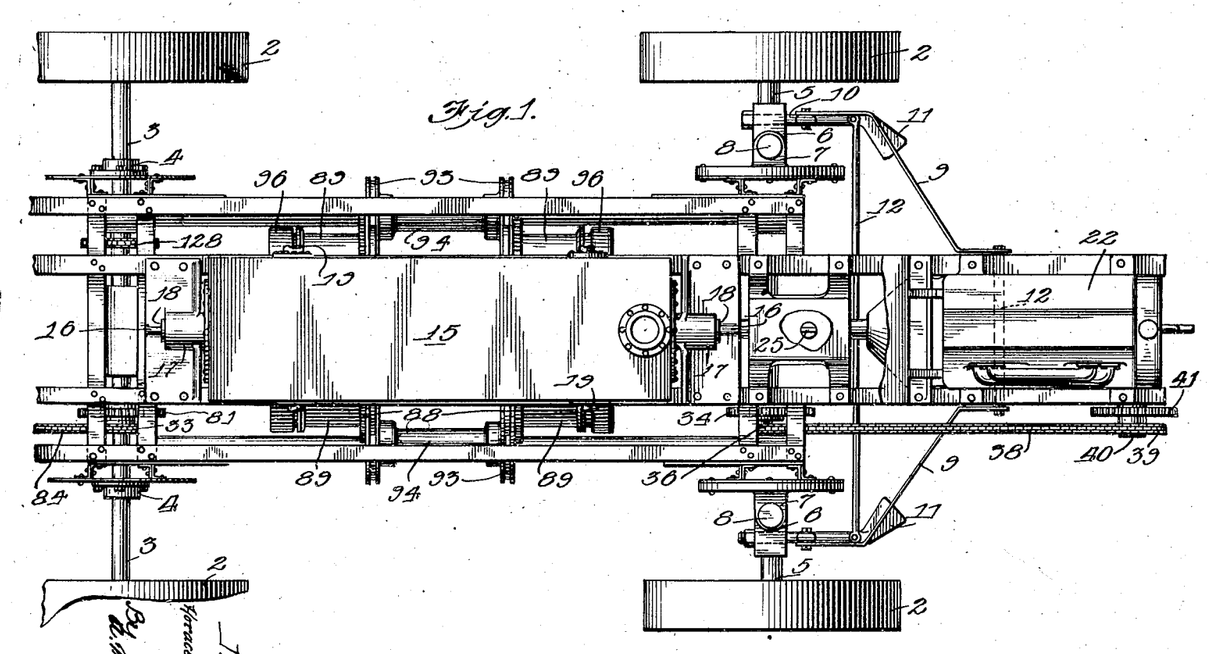
Fig. 1 is a top plan view of my invention with a portion of the rear broken away.
Figure 2:
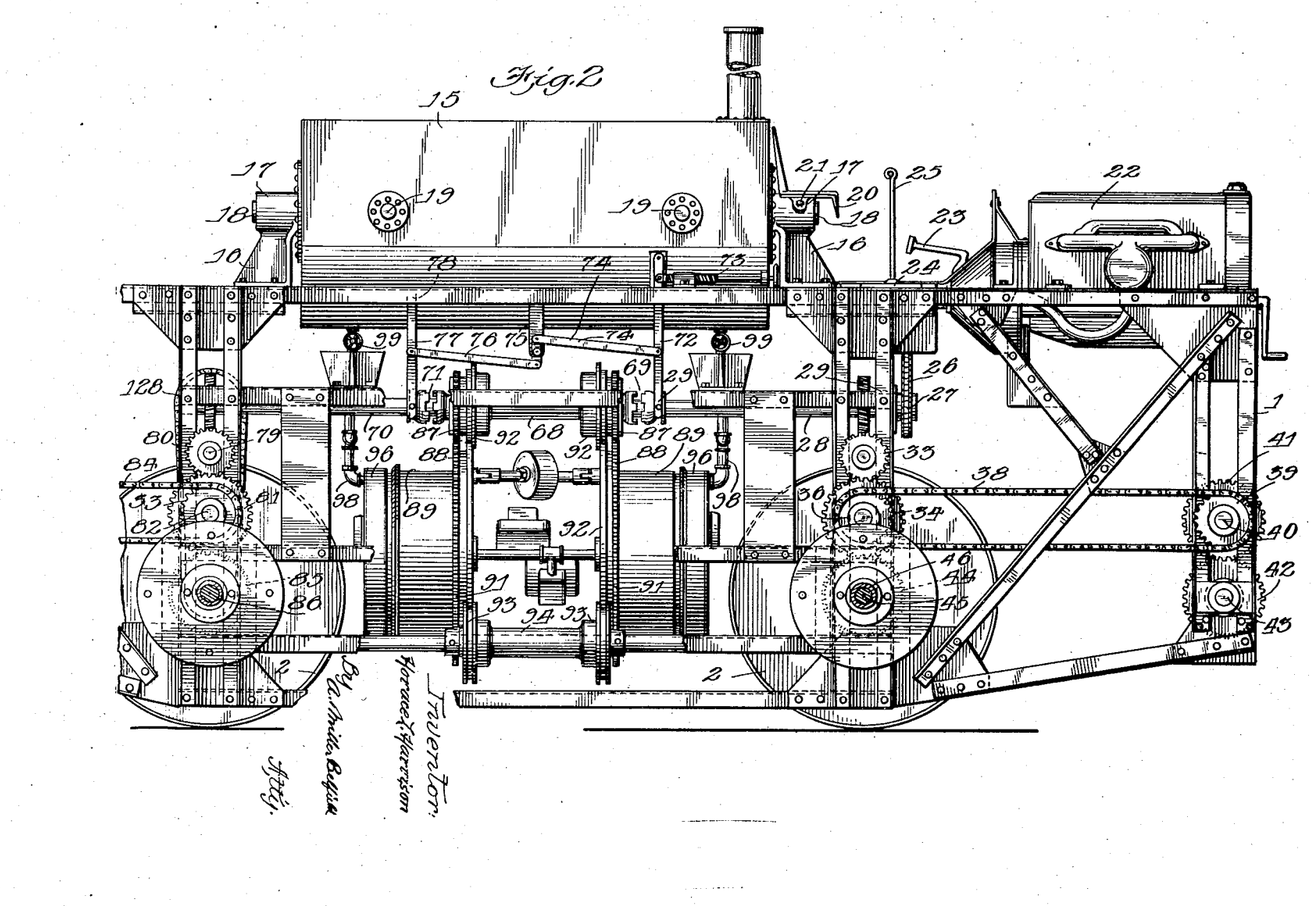
Fig. 2 is a side elevation of the same.
Figure 3:
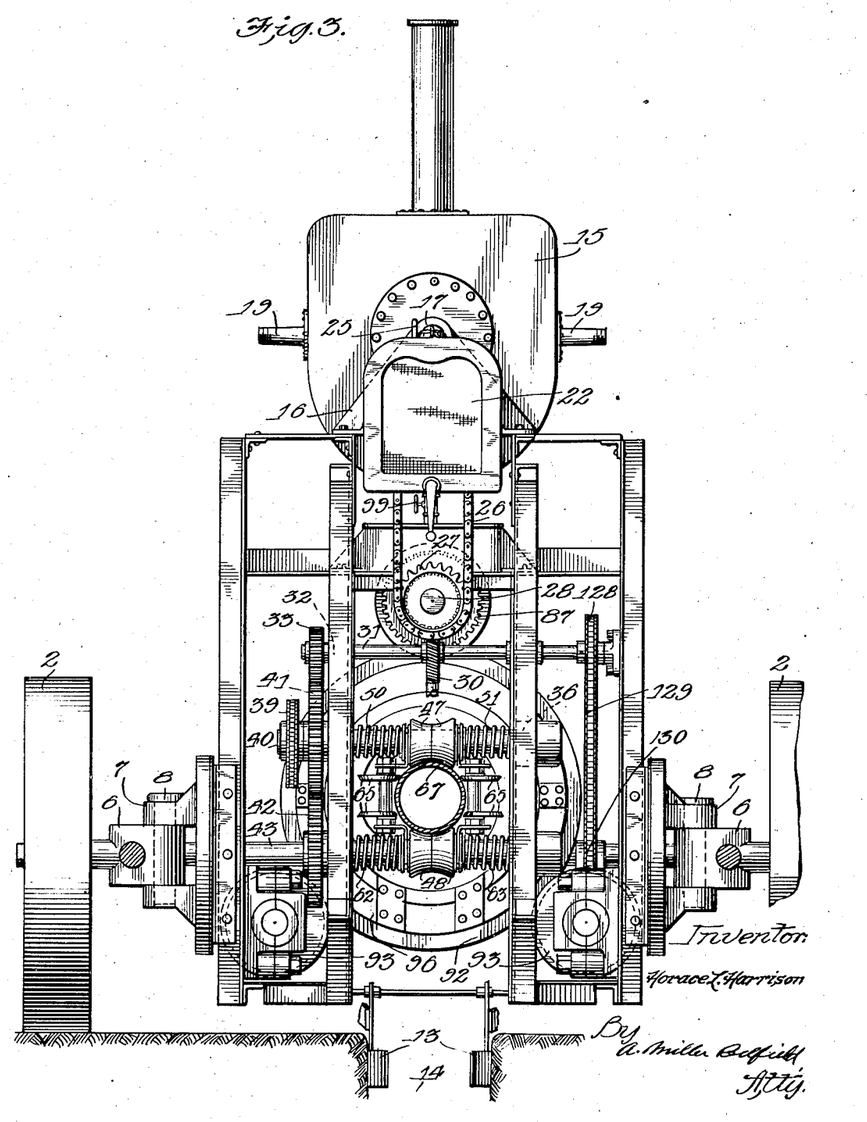
Fig. 3 is a front elevation of the same.
Figure 4:
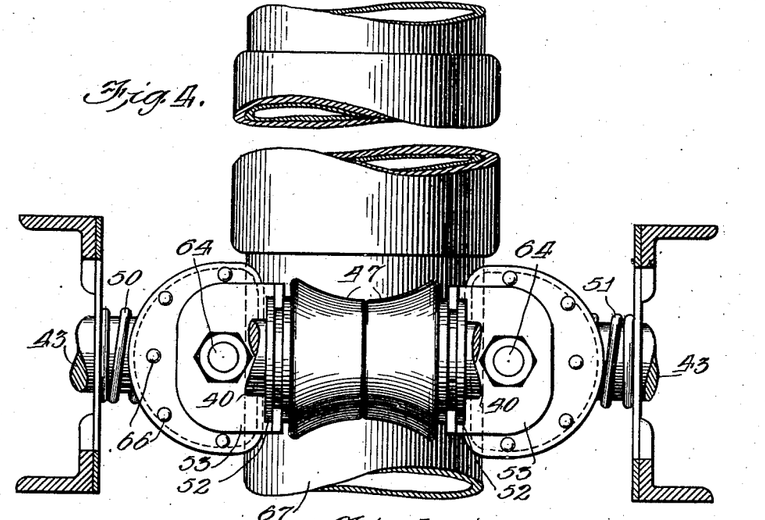
Fig. 4 is an enlarged detail plan of the pipe feeding mechanism.
Figure 5:
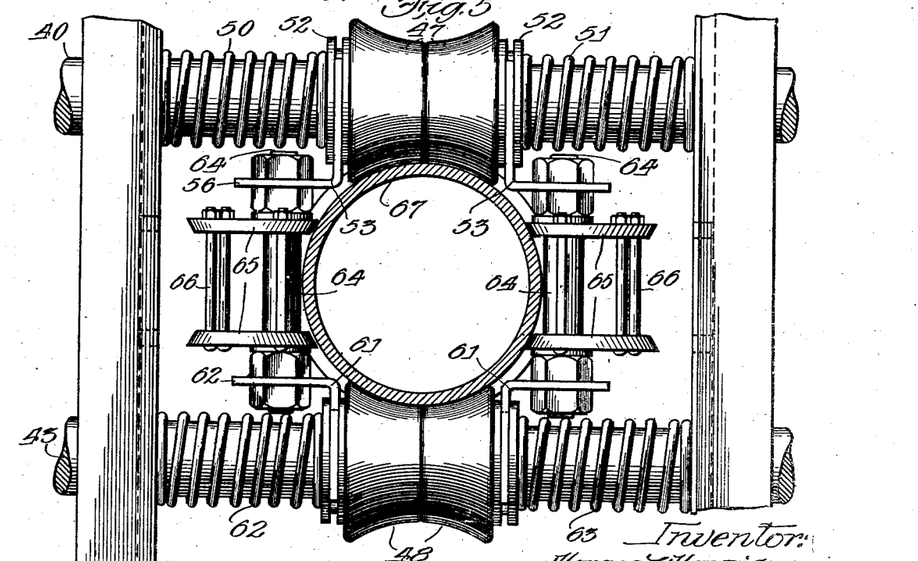
Fig. 5 is an elevation of the same illustrating the pipe in section.
Figure 6:
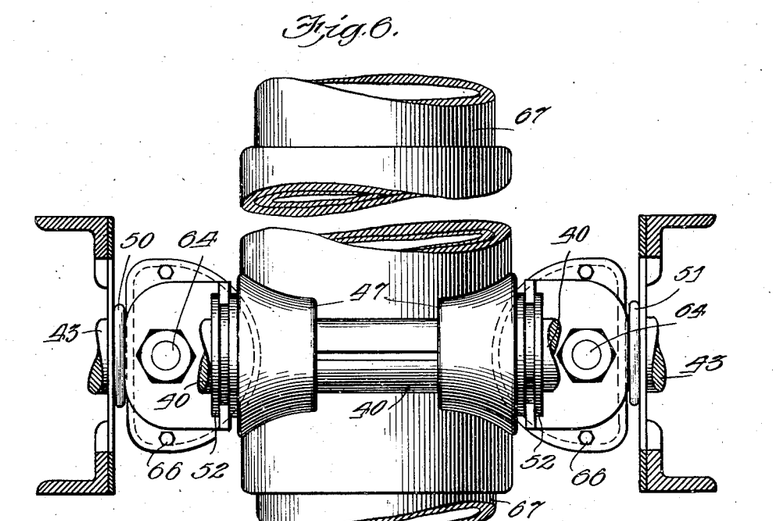
Fig. 6 is a view similar to Fig. 4 of the feeding mechanism illustrating its position when feeding through a pipe coupling.
Figure 7:
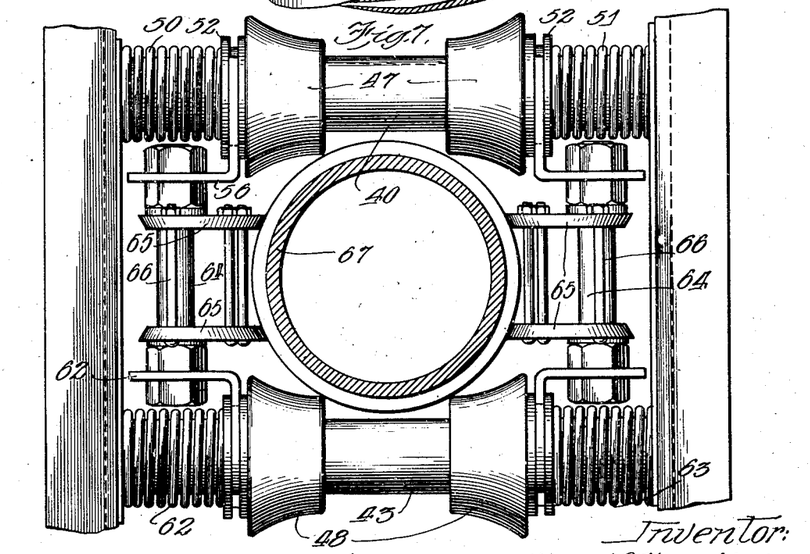
Fig. 7 is an elevation of the same.

As the pipe line is fed through the machine certain portions of it are larger than others where two pipes are coupled together. It is necessary, therefore, that the rolls 47 and 48 accommodate these larger portions of the pipe. This result is brought about by the operation of the cam members 65. When the edge of the pipe coupling strikes the cam member 65 it brings about their rotation with the consequent spreading of the split rolls 47 and 48 into the position shown in Figs. 6 and 7 and causes the compression of the springs 50, 51, 62 and 63. The cam members 65 continue to rotate until they assume their original position, as may be seen from Fig. 4. The circumference of the cams 65 is determined by the length of the pipe couplings so that the coupling will be passed through the rolls before the cams 65 return to their original position.

In this manner the machine will continue to operate until the whole pipe line has been effectively wrapped and insulated.

Attention is directed to the fact that the provision of the four sets of feeding rolls causes the pipe to be perfectly straight or the machine will support separate lengths of pipe within itself when passing through the wrapping mechanism so that the wrapping is applied more firmly and with less danger of becoming tangled than would be the case with only two sets of feeding rolls. It is obvious that my improved machine may be used, in addition to the treating, cleaning and wrapping of pipe described, for the wrapping and treating of any other cylindrically shaped article such as cables, and wood poles.

It will be understood that while I have described certain specific embodiments of my invention, many changes, variations and deviations may be made therefrom without departing from the spirit and scope thereof, as indicated in the appended claims.

I claim:

1. In a pipe treating machine or like device, the combination of a frame, wheels for supporting said frame upon the ground adjacent a pipe to be treated, pipe treating mechanism mounted on said frame, a source of power for said machine, means for connecting said source to said wheels, and a clutch for connecting said source to said mechanism.

2. In a pipe treating machine, the combination with a frame work, wheels on which said frame is mounted adapted to straddle a trench, pipe treating mechanism mounted on said framework, and steering means for guiding said wheels.

3. In a machine for treating cylindrically shaped objects, the combination with a framework, wheels for carrying said framework adapted to straddle a trench, treating mechanism mounted on the framework, and steering means for guiding said wheels to cause said framework to follow said trench.

4. In a pipe treating machine, the combination with a framework, wheels on which said frame is mounted adapted to straddle a trench, pipe wrapping mechanism, means for propelling said framework, and steering means automatically operative to cause said framework to follow said trench.

5. In a pipe treating machine, the combination with a framework, wheels on which said frame is mounted adapted to straddle a trench, pipe wrapping mechanism, means for propelling said framework, and steering members mounted on said framework and connected to the front wheels thereof adapted to cause said wheels to turn with said trench.

6. In a pipe treating machine, the combination with a framework, wheels on which said frame is mounted adapted to straddle a trench, pipe wrapping mechanism, means for propelling said framework, a pair of members mounted on said framework and pressing against the sides of the trench and connected to said wheels, and means for causing said members to turn said wheels.

7. In a device of the class described, the combination with a relatively stationary frame, of pipe treating mechanism carried thereby and adapted to encircle the pipe carried by the frame, and means for causing said pipe treating mechanism to advance along the pipe, said means comprising two sets of diametrically opposed split rollers engaging the periphery of the pipe, the split portions of the rollers being held in closely abutting relation by springs.

8. In a pipe treating machine, the combination with a frame, wheels upon which said frame is mounted, pipe treating mechanism mounted on said frame, means for operating said mechanism and for propelling said machine along a pipe, a set of diametrically opposed split rollers having corrugated surfaces resiliently held against said pipe, and mechanism for driving said rolls.

9. In a pipe treating machine, the combination with a frame, wheels upon which said frame is mounted, pipe treating mechanism mounted on said frame, means for operating said mechanism and for propelling said machine along a pipe, a set of diametrically opposed split rollers having corrugated surfaces resiliently held against said pipe, mechanism for driving said rolls, and a cam associated with said rolls and operative to force the split portions of cooperating rolls apart to accommodate pipes of larger diameter.

10. In a pipe treating machine, the combination with a frame, wheels upon which said frame is mounted, pipe treating mechanism mounted on said frame, means for operating said mechanism and for propelling said machine along a pipe, a set of diametrically opposed split rollers having corrugated surfaces resiliently held against said pipe, mechanism for driving said rolls, and means associated with said rolls automatically operative to enlarge the distance between them to accommodate a pipe of larger diameter when such pipe is fed through said rolls.

11. In a pipe treating machine, the combination with a framework, of wheels upon which said framework is mounted, means for propelling said machine, including a drive shaft, for rotating said wheels, mechanism for feeding pipe through said machine comprising power driven rolls in contact with the pipe, pipe treating and wrapping mechanism, a hollow shaft for operating said mechanism, and a clutch for connecting said shaft to the drive shaft.

12. A pipe treating machine comprising a framework, means for moving said framework along a trench, pipe treating mechanism comprising a pair of rotatable cylinders having open ends, the open ends of said cylinders fitting into a pair of stationary cylinders, and guiding means mounted on said framework for maintaining them in a definite position during such rotation.

13. A pipe treating machine, comprising a framework, means for moving said framework along a trench, a pipe treating mechanism comprising a pair of rotatable cylinders having open ends, the open ends of said cylinders fitted into a pair of stationary cylinders and guiding means for co-operating with a trench to direct said machine along the trench mounted on said framework.

14. In a pipe treating machine the combination with a frame, wheels upon which said frame is mounted, pipe treating mechanism mounted on said frame, motor means for operating said mechanism and for propelling said machine along a pipe, a set of diametrically opposed split rollers having corrugated surfaces resiliently held against said pipe mechanism for driving said wheels, and mechanism for spreading and contracting said rolls to accommodate a pipe of a larger or smaller diameter.

15. In a pipe treating machine, the combination with a framework, wheels on which said frame is mounted adapted to straddle a trench, pipe treating means mounted on said framework and steering means co-operating with said trench for directing said machine along a trench.

16. In apparatus of the class described, the combination of a frame, a pair of sets of diametrically opposed split rollers having corrugated surfaces, spring means holding the portions of said rollers together and driving means for both sets of rollers, one of said sets mounted parallel to the other and spaced thereabove.

17. In apparatus of the class described, the combination of a frame, a pair of sets of diametrically opposed split rollers having corrugated surfaces, and means associated with said split rollers for separating the same or contracting the same to engage a pipe of either a large or small diameter.

HORACE L. HARRISON.